United States Patent
Zhang et al.

(10) Patent No.: US 11,508,278 B2
(45) Date of Patent: Nov. 22, 2022

(54) SIGNAL TRANSMISSION METHOD, SIGNAL TRANSMISSION APPARATUS AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Shaoru Zhang, Beijing (CN); Wei Sun, Beijing (CN); Jian Zhang, Beijing (CN); Yang Chen, Beijing (CN); Di Kong, Beijing (CN); Qingqing Ma, Beijing (CN); Wei Wang, Beijing (CN)

(73) Assignees: BEIJING BOE OPTOELECTRONICS TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 302 days.

(21) Appl. No.: 16/651,740

(22) PCT Filed: Mar. 26, 2019

(86) PCT No.: PCT/CN2019/079689
§ 371 (c)(1),
(2) Date: Mar. 27, 2020

(87) PCT Pub. No.: WO2020/191617
PCT Pub. Date: Oct. 1, 2020

(65) Prior Publication Data
US 2021/0217340 A1    Jul. 15, 2021

(51) Int. Cl.
*H04N 5/225* (2006.01)
*G09G 3/20* (2006.01)
(Continued)

(52) U.S. Cl.
CPC ............ *G09G 3/20* (2013.01); *H04B 1/707* (2013.01); *G09G 2310/08* (2013.01);
(Continued)

(58) Field of Classification Search
CPC ....... G06T 1/20; G06T 3/0006; G06T 1/0064; G06T 2201/0052; G06T 5/002;
(Continued)

(56) References Cited

U.S. PATENT DOCUMENTS

2003/0132926 A1* 7/2003 Lee .................. H04B 15/04
    345/204
2014/0192097 A1   7/2014 Baek et al.
(Continued)

FOREIGN PATENT DOCUMENTS

CN       103928004 A      7/2014

*Primary Examiner* — Eva Y Puente
(74) *Attorney, Agent, or Firm* — Brooks Kushman P.C.

(57) ABSTRACT

A signal transmission method, a signal transmission apparatus and a display device are provided which belonging to the field of display technology. The signal transmission method is applied to a signal sender, the signal sender includes a first interface, a point-to-point connection is established between the first interface and a second interface of a signal receiver, the signal transmission method includes: sending a non-periodic training signal to the second interface via the first interface in an interval of transmission of pixel data. EMI generated during data transmission is reduced by using a technical solution of the present disclosure.

16 Claims, 4 Drawing Sheets

(51) Int. Cl.
*H04B 1/707* (2011.01)
*H04B 3/23* (2006.01)
*H04B 7/0456* (2017.01)
*H04W 72/04* (2009.01)

(52) U.S. Cl.
CPC ..... *G09G 2330/06* (2013.01); *G09G 2370/00* (2013.01); *H04B 3/238* (2013.01); *H04B 7/0456* (2013.01); *H04N 5/225* (2013.01); *H04W 72/0413* (2013.01)

(58) Field of Classification Search
CPC . G06T 2201/0051; G06T 5/50; G06T 1/0021; H04N 5/225; H04N 5/2628; H04N 2101/00; H04N 1/0044; H04N 1/2154; H04N 1/2112; H04N 2201/328; H04N 2201/3269; G06V 10/82; G06V 20/52; G06V 20/20; G06V 10/44; G06V 10/40; G06V 10/25; G06V 20/56; G06V 40/172; G06V 40/10; H04B 7/0456; H04B 7/0695; H04B 7/0417; H04B 7/0617; H04B 7/0626; H04B 7/0632; H04B 7/0656; H04B 7/088
USPC .......................................................... 375/130
See application file for complete search history.

(56) References Cited

U.S. PATENT DOCUMENTS

2016/0217762 A1\* 7/2016 Moon .................... G09G 5/006
2017/0026696 A1\* 1/2017 Aubineau ........ H04N 21/43632
2018/0190238 A1\* 7/2018 Park ....................... G09G 5/008

\* cited by examiner

Clock pattern ⟨D9⟩⟨D0⟩⟨D1⟩⟨D2⟩⟨D3⟩⟨D4⟩⟨D5⟩⟨D6⟩⟨D7⟩⟨D8⟩⟨D9⟩⟨D0⟩

Fig. 3

Sending a non-periodic training signal to a second interface via a first interface in an interval of transmission of pixel data — 101

Fig. 4

Selecting a training sub-signal for transmission from a pre-stored training signal set according to a random code outputted by a signal sender and a previous training sub-signal sent at a same interval, wherein the training signal set includes the plurality of training sub-signals, and a combination of any two training sub-signals among the plurality of training sub-signals is a non-periodic signal ⎯201

SIGNAL TRANSMISSION METHOD, SIGNAL TRANSMISSION APPARATUS AND DISPLAY DEVICE

CROSS-REFERENCE TO RELATED APPLICATIONS

This application is the U.S. national phase of PCT Application No. PCT/CN2019/079689 filed on Mar. 26, 2019, which is incorporated herein by reference in its entirety.

TECHNICAL FIELD

The present disclosure relates to the field of display technology, and in particular, relates to a signal transmission method, a signal transmission apparatus and a display device.

BACKGROUND

A Point-to-Point (P2P) interface of a current display device generates significant Electro Magnetic Interference (EMI) during data transmission, which causes significant interference to transmitted data, thereby leading to an appearance of snowflake dots or abnormal images in a display, and even in some cases, causing a P2P signal to be unlocked. Further, the significant EMI causes interference to electronic components of the display device, thereby causing unpredictable defects and damages.

SUMMARY

A signal transmission method, a signal transmission apparatus and a display device are provided in the present disclosure, which may reduce EMI generated during data transmission.

Technical solutions of the embodiments of the present disclosure are as follow.

In an aspect, a signal transmission method applied to a signal sender is provided, the signal sender including a first interface, a point-to-point connection being established between a second interface of a signal receiver and the first interface. The signal transmission method includes: sending a non-periodic training signal to the second interface via the first interface in an interval of transmission of pixel data.

Further, the training signal includes a plurality of training sub-signals, and sending the non-periodic training signal to the second interface via the first interface includes: selecting a training sub-signal for transmission from a pre-stored training signal set according to a random code outputted by the signal sender and a previous training sub-signal sent at a same interval, wherein the training signal set includes the plurality of training sub-signals, and a combination of any two training sub-signals among the plurality of training sub-signals is a non-periodic signal.

Further, before sending the non-periodic training signal to the second interface via the first interface, the signal transmission method further includes: setting a signal transmission mode as an Electro Magnetic Interference (EMI) reduction mode.

Further, the signal sender is a timing controller.

Further, the training signal set includes a first training sub-signal, a second training sub-signal, a third training sub-signal and a fourth training sub-signal, selecting the training sub-signal for transmission from the pre-stored training signal set, according to the random code outputted by the signal sender and the previous training sub-signal sent at the same interval includes: sending the third training sub-signal when the random code is 1 and the previous training sub-signal sent at the same interval is the first training sub-signal; sending the first training sub-signal when the random code is 0 and the previous training sub-signal sent at the same interval is the first training sub-signal; sending the fourth training sub-signal when the random code is 1 and the previous training sub-signal sent at the same interval is the second training sub-signal; sending the second training sub-signal when the random code is 0 and the previous training sub-signal sent at the same interval is the second training sub-signal; sending the fourth training sub-signal when the random code is 1 and the previous training sub-signal sent at the same interval is the third training sub-signal; sending the second training sub-signal when the random code is 0 and the previous training sub-signal sent at the same interval is the third training sub-signal; sending the third training sub-signal when the random code is 1 and the previous training sub-signal sent at the same interval is the fourth training sub-signal; sending the first training sub-signal when the random code is 0 and the previous training sub-signal sent at the same interval is the fourth training sub-signal.

Further, the first training sub-signal is 1000000000, the second training sub-signal is 0111111111, the third training sub-signal is 1001111111, and the fourth training sub-signal is 0110000000.

The embodiments of the present disclosure further provide a signal transmission method applied to a signal receiver, the signal receiver including a second interface, a point-to-point connection being established between a first interface of a signal sender and the second interface. The signal transmission method includes: receiving, via the second interface in an interval of transmission of pixel data, a non-periodic training signal sent by the first interface.

Further, the signal receiver is a source driving circuit.

The embodiments of the present disclosure further provide a signal transmission apparatus applied to a signal sender, the signal sender including a first interface, a point-to-point connection being established between a second interface of a signal receiver and the first interface. The signal transmission apparatus includes: a sending module, configured to send a non-periodic training signal to the second interface via the first interface in an interval of transmission of pixel data.

Further, the training signal includes a plurality of training sub-signals, the sending module is configured to select a training sub-signal for transmission from a pre-stored training signal set according to a random code outputted by the signal sender and a previous training sub-signal sent at a same interval, wherein the training signal set includes the plurality of training sub-signals, and a combination of any two training sub-signals among the plurality of training sub-signals is a non-periodic signal.

Further, the signal transmission apparatus further includes: a setting module, configured to set a signal transmission mode as an Electro Magnetic Interference (EMI) reduction mode before sending the non-periodic training signal to the second interface via the first interface.

Further, the signal sender is a timing controller.

Further, the training signal set includes a first training sub-signal, a second training sub-signal, a third training sub-signal and a fourth training sub-signal, the sending module is specifically configured to: send the third training sub-signal when the random code is 1 and the previous training sub-signal sent at the same interval is the first training sub-signal; send the first training sub-signal when the random code is 0 and the previous training sub-signal sent at the same interval is the first training sub-signal; send the fourth training sub-signal when the random code is 1 and the previous training sub-signal sent at the same interval is the second training sub-signal; send the second training sub-signal when the random code is 0 and the previous training sub-signal sent at the same interval is the second training sub-signal; send the fourth training sub-signal when the random code is 1 and the previous training sub-signal sent at the same interval is the third training sub-signal; send the second training sub-signal when the random code is 0 and the previous training sub-signal sent at the same interval is the third training sub-signal; send the third training sub-signal when the random code is 1 and the previous training sub-signal sent at the same interval is the fourth training sub-signal; send the first training sub-signal when the random code is 0 and the previous training sub-signal sent at the same interval is the fourth training sub-signal.

Further, the first training sub-signal is 1000000000, the second training sub-signal is 0111111111, the third training sub-signal is 1001111111, and the fourth training sub-signal is 0110000000.

The embodiments of the present disclosure further provide a signal transmission apparatus applied to a signal receiver, the signal receiver including a second interface, a point-to-point connection being established between a first interface of a signal sender and the second interface. The signal transmission apparatus includes a receiving module, configured to receive, via the second interface in an interval of transmission of pixel data, a non-periodic training signal sent by the first interface.

Further, the signal receiver is a source driving circuit.

The embodiments of the present disclosure further provide a display device including the signal transmission apparatus above.

DETAILED DESCRIPTION

In order to make a technical problem to be solved, a technical solution and an advantage of the embodiments of the present disclosure clearer, a detail description will be given below with reference to the accompanying drawings and the specific embodiments.

Figure 1:
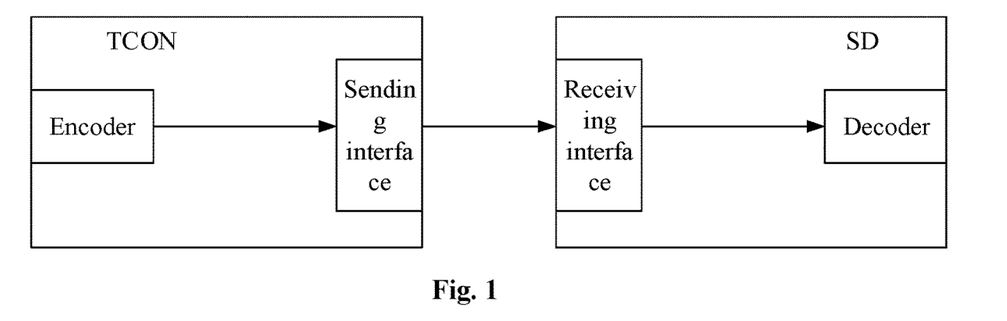
FIG. 1 is a schematic diagram of establishing a P2P connection between a TCON and a SD.

In a display product, in order to transmit data, a point-to-point (P2P) connection is established between two interfaces. As shown in FIG. 1, one of the interfaces may be a sending interface of a Timing Controller (TCON), and the other may be a receiving interface of a Source Driver (SD), the TCON sends pixel data to the receiving interface of the SD via the sending interface.

Figure 2:
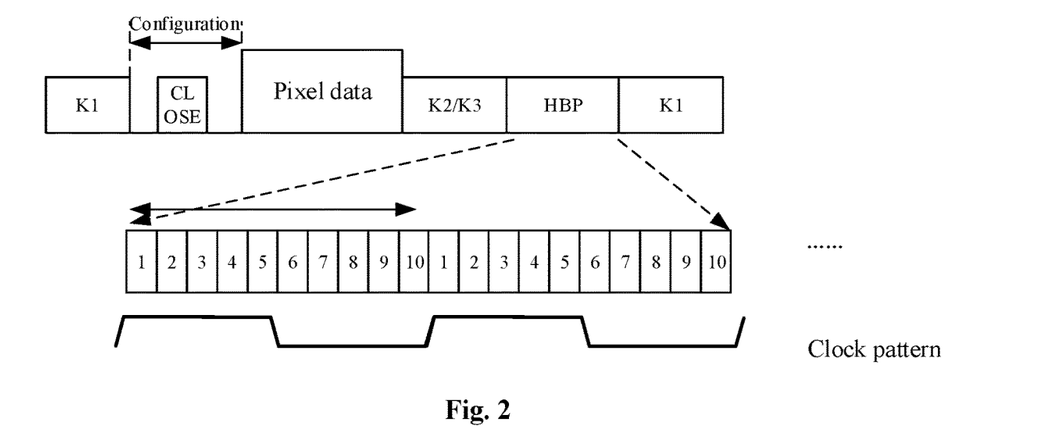
FIG. 2 is a schematic diagram of transmitting a clock pattern between a TCON and a SD as a training signal.
Figure 3:
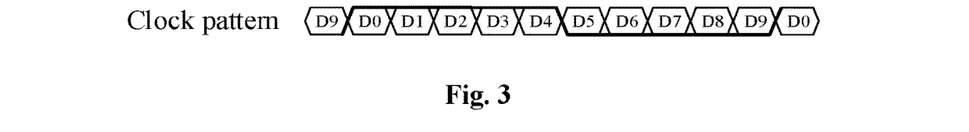
FIG. 3 is a waveform diagram of a clock pattern.

In an interval of transmission of pixel data, such as an interval (e.g., Horizontal Back Porch (HBP) of transmission of adjacent rows of pixel data and an interval (e.g., Vertical Back Porch (VBP)) of transmission of adjacent frames of pixel data, for a purpose of preventing signal transmission between the TCON and the SD from being unlocked, as shown in FIG. 2, a clock pattern is transmitted between the TCON and the SD as a training signal to maintain a P2P connection between the TCON and the SD. In prior art, the clock pattern is 1111100000, and a waveform of the clock pattern is shown in FIG. 3. It may be seen that the clock pattern is a periodic signal, and transmission of the periodic signal causes a significant EMI, and is a main source of significant EMI.

A display device in the prior art has problems that a Point-to-Point (P2P) interface of a display device generates significant Electro Magnetic Interference (EMI) during data transmission, causing significant interference to data transmission and thereby leading to an appearance of snowflake dots or abnormal images in a display, and even in some cases causing a P2P signal to be unlocked, and further, the significant EMI causes interference to electronic components of the display device, thereby causing unpredictable defects and damages. In view of this problem, some embodiments of the present disclosure provide a signal transmission method, a signal transmission apparatus and a display device to reduce the EMI generated during the data transmission.

Figure 4:
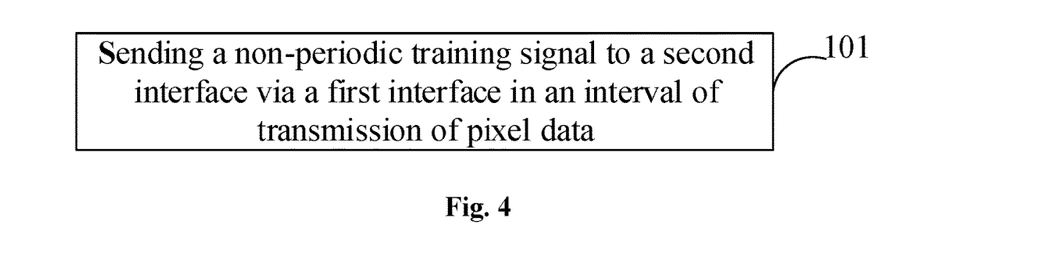
FIG. 4 is a schematic flowchart of a signal transmission method in some embodiments of the present disclosure.

A signal transmission method is provided in the embodiments of the present disclosure. The signal transmission method is applied to a signal sender, the signal sender includes a first interface. A point-to-point connection is established between a second interface of a signal receiver and the first interface. As shown in FIG. 4, the signal transmission method includes a step 101.

Step 101: sending a non-periodic training signal to the second interface via the first interface in an interval of transmission of pixel data.

Since an origin of the generated EMI during the data transmission is a transmitted periodic training signal in an interval of transmission of pixel data, the non-periodic training signal is sent to the second interface via the first interface in the interval of transmission of pixel data in this embodiment, which eliminates the origin of the generated EMI during the data transmission in P2P interfaces fundamentally, thereby greatly reducing the EMI generated in the P2P interfaces during the data transmission.

Figure 5:
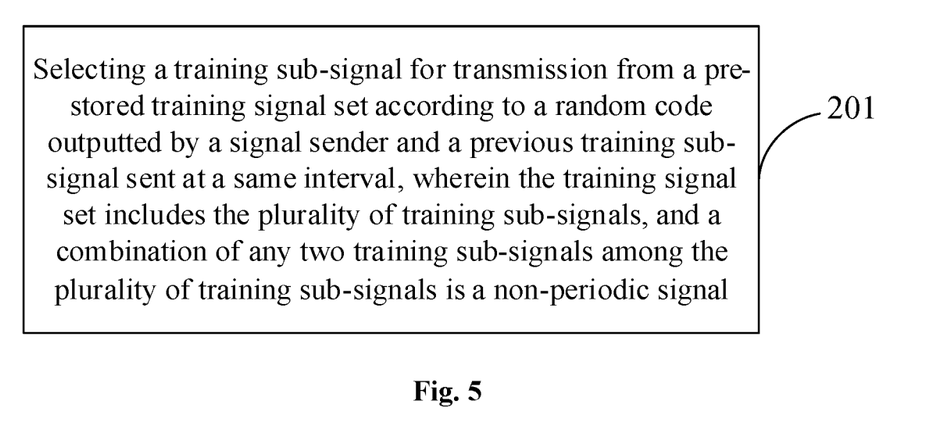
FIG. 5 is a schematic flowchart of selecting a training sub-signal for transmission in some embodiments of the present disclosure.

In a specific embodiment, as shown in FIG. 5, the training signal includes a plurality of training sub-signals, and sending the non-periodic training signal to the second interface via the first interface includes a sub-step 201.

Sub-step 201: selecting a training sub-signal for transmission from a pre-stored training signal set according to a random code outputted by the signal sender and a previous training sub-signal sent at a same interval, wherein the training signal set includes a plurality of training sub-signals, and a combination of any two training sub-signals among the plurality of training sub-signals is a non-periodic signal. Thus, it is ensured that the non-periodic training signal is sent to the second interface via the first interface in the interval of transmission of pixel data.

The number of sent training sub-signals is determined by a transmission rate and a length of the interval. The signal sender and the signal receiver may agree on the length of the interval in advance. After the interval is ended, the signal sender stops sending the training signal, and the signal receiver stop receiving the training signal; or, the signal sender and the signal receiver may agree on that when sending the training signal is ended, the signal sender sends an end signal to the signal receiver, then the signal sender no longer sends the training signal, and the signal receiver no longer receives the training signal.

Further, before sending the non-periodic training signal to the second interface via the first interface, the signal transmission method further includes: setting a signal transmission mode as an Electro Magnetic Interference (EMI) reduction mode.

A function of setting the EMI mode is added in this embodiment. When the EMI reduction mode is not turned on, a periodic training signal is transmitted between the first interface and the second interface according to a conventional mode. When the EMI reduction mode is turned on, the non-periodic training signal is sent to the second interface via the first interface in this embodiment to reduce the EMI generated during the data transmission between the first interface and the second interface.

Figure 6:
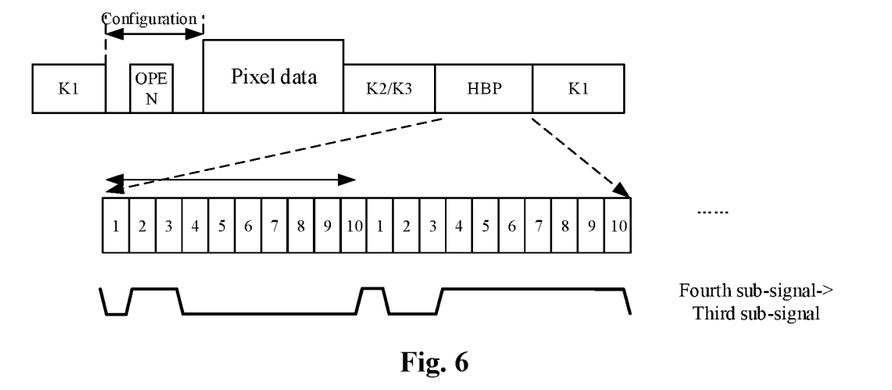
FIG. 6 is a schematic diagram of a data packet of row data sent in some embodiments of the present disclosure.

FIG. 2 is a schematic structural diagram of a data packet of each row of data sent by the first interface to the second interface. The data packet of each row of data includes a start flag bit K1, pixel data, and an end flag bit K2/K3. After the end flag bit K2/K3 of the data packet of each row of data, it is an HBP interval, i.e., a time duration between data packets of adjacent rows of data. In this embodiment, a configuration information section may be set between K1 and the pixel data. After configuring whether to turn on the EMI reduction mode by the configuration information section, specifically, when configuration information is CLOSE, the EMI reduction mode is turned off; as shown in FIG. 6, when the configuration information is OPEN, the EMI reduction mode is turned on.

In addition, the technical solution of this embodiment is not limited to transmitting the non-periodic training signal in the interval between the data packets of adjacent rows of data so as to reduce the EMI, and may also include transmitting a non-periodic training signal in an interval between data packets of adjacent frames of data so as to reduce the EMI. Specifically, related configuration information may be configured in a data packet of each frame of data, and whether to turn on the EMI reduction mode may be configured by the configuration information. Specifically, when the configuration information is CLOSE, the EMI reduction mode is turned off; when the configuration information is OPEN, the EMI reduction mode is turned on.

In a specific embodiment, the signal sender is a timing controller, and the signal receiver is a source driving circuit. Of course, the signal sender involved in the present disclosure is not limited to the timing controller, and may be any port, in a display device, that needs to establish the P2P connection to send data. The signal receiver is not limited to the source driving circuit, and may be any port, in a display device, that needs to establish the P2P connection to receive data.

In a specific embodiment, the training signal set includes a first training sub-signal, a second training sub-signal, a third training sub-signal and a fourth training sub-signal. Selecting a training sub-signal for transmission from a pre-stored training signal set, according to a random code outputted by the signal sender and a previous training sub-signal sent at a same interval includes: (1) sending the third training sub-signal when the random code is 1 and the previous training sub-signal sent at the same interval is the first training sub-signal; (2) sending the first training sub-signal when the random code is 0 and the previous training sub-signal sent at the same interval is the first training sub-signal; (3) sending the fourth training sub-signal when the random code is 1 and the previous training sub-signal sent at the same interval is the second training sub-signal; (4) sending the second training sub-signal when the random code is 0 and the previous training sub-signal sent at the same interval is the second training sub-signal; (5) sending the fourth training sub-signal when the random code is 1 and the previous training sub-signal sent at the same interval is the third training sub-signal; (6)

sending the second training sub-signal when the random code is 0 and the previous training sub-signal sent at the same interval is the third training sub-signal; (7)

sending the third training sub-signal when the random code is 1 and the previous training sub-signal sent at the same interval is the fourth training sub-signal; and (8) sending the first training sub-signal when the random code is 0 and the previous training sub-signal sent at the same interval is the fourth training sub-signal.

When the training sub-signal is sent for the first time in the interval, any one of training sub-signals may be selected from the pre-stored training signal set for transmission.

Specifically, the first training sub-signal is 1000000000, the second training sub-signal is 0111111111, the third training sub-signal is 1001111111, and the fourth training sub-signal is 0110000000. Thus, it is ensured that any two training sub-signals do not constitute a periodic signal, and when the training signal is composed of a plurality of training sub-signals, the training signal generated in the above manner is not the periodic signal, which eliminates the origin of generated EMI during the data transmission in the P2P interfaces fundamentally, thereby greatly reducing the EMI generated in the P2P interfaces during the data transmission.

In this embodiment, by constructing four special training sub-signals and generating random training signals according to the random code in the interval of transmission of pixel data, this embodiment eliminates the origin of generated EMI during the data transmission in the P2P interfaces fundamentally, thereby greatly reducing the EMI generated in the P2P interfaces during the data transmission.

In the technical solution of the present disclosure, the training signal set is not limited to include only four training sub-signals, and may also include more training sub-signals, but if types of the training sub-signals included in the training signal set are increased, complexity of signal transmission is also increased, and then a power consumption of the display device is also increased. Therefore, the training signal set may be designed to include four training sub-signals, without increasing the complexity of the signal transmission and without generating a periodic training signal.

A signal transmission method is further provided in the embodiments of the present disclosure. The signal transmission method is applied to a signal receiver, wherein the signal receiver includes a second interface, a point-to-point connection is established between a first interface of a signal sender and the second interface, the signal transmission method includes: receiving, via the second interface in an interval of transmission of pixel data, a non-periodic training signal sent by the first interface.

Since an origin of the generated EMI during the data transmission is a transmitted periodic training signal in an interval of transmission of pixel data, the non-periodic training signal is sent to the second interface via the first interface in the interval of transmission of pixel data in this embodiment, which eliminates the origin of the generated EMI during the data transmission in P2P interfaces fundamentally, thereby greatly reducing the EMI generated in the P2P interfaces during the data transmission.

In a specific embodiment, the signal sender is a timing controller, and the signal receiver is a source driving circuit. Of course, the signal sender involved in the present disclosure is not limited to the timing controller, and may be any port, in a display device, that needs to establish the P2P connection to send data. The signal receiver is not limited to the source driving circuit, and may be any port, in a display device, that needs to establish the P2P connection to receive data.

The signal transmission method in the present disclosure is further introduced herein with reference to the drawings and the specific embodiments.

Figure 7:
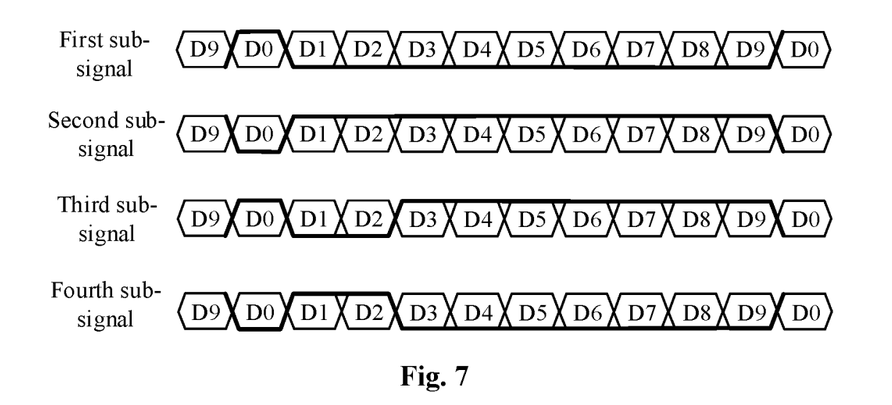
FIG. 7 is a waveform schematic diagram of four training sub-signals designed in some embodiments of the present disclosure.

In order to not increase complexity of signal transmission to a maximum extent without causing a signal being unlocked, and to not generate a periodic training signal, four training sub-signals are designed in this embodiment, which are the first training sub-signal #1 (1000000000), the second training sub-signal #2 (0111111111), the third training sub-signal #3 (1001111111) and the fourth training sub-signal #4 (0110000000). FIG. 7 is a waveform schematic diagram of the four training sub-signals.

Figure 8:
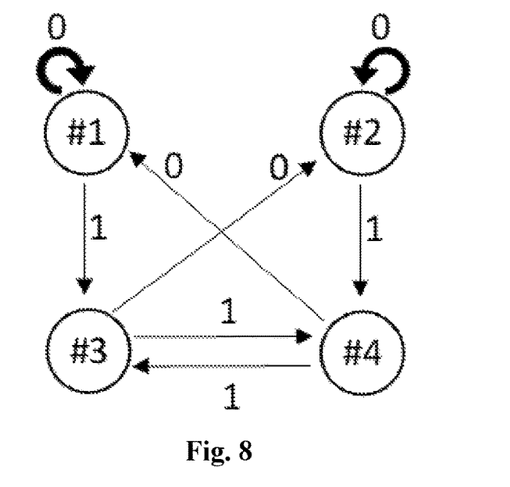
FIG. 8 is a schematic diagram of conversions among four training sub-signals in some embodiments of the present disclosure.

FIG. 8 is a schematic diagram of conversions among the four training sub-signals when transmitting a training signal, where a number on an arrow is a conversion condition, the number is a random code generated by an encoder in a TCON, and identifiers of the four signals are shown in circles. Specifically, (1) when the previous training sub-signal sent at the same interval is the training sub-signal #1 and the random code generated by the encoder in the TCON is 0, the training sub-signal #1 is still transmitted at a current moment; (2) when the previous training sub-signal sent at the same interval is the training sub-signal #1 and the random code generated by the encoder in the TCON is 1, the training sub-signal #3 is transmitted at the current moment; (3) when the previous training sub-signal sent at the same interval is the training sub-signal #2 and the random code generated by the encoder in the TCON is 0, the training sub-signal #2 is still transmitted at the current moment; (4) when the previous training sub-signal sent at the same interval is the training sub-signal #2 and the random code generated by the encoder in the TCON is 1, the training sub-signal #4 is transmitted at the current moment; (5) when the previous training sub-signal sent at the same interval is the training sub-signal #3 and the random code generated by the encoder in the TCON is 0, the training sub-signal #2 is transmitted at the current moment; (6) when the previous training sub-signal sent at the same interval is the training sub-signal #3 and the random code generated by the encoder in the TCON is 1, the training sub-signal #4 is transmitted at the current moment; (7) when the previous training sub-signal sent at the same interval is the training sub-signal #4 and the random code generated by the encoder in the TCON is 0, the training sub-signal #1 is transmitted at the current moment; (8) when the previous training sub-signal sent at the same interval is the training sub-signal #4 and the random code generated by the encoder in the TCON is 1, the training sub-signal #3 is transmitted at the current moment. Thus, the training signal transmitted between the TCON and the SD may be guaranteed to be the non-periodic training signal by using the design.

As shown in FIG. 6, after the display device is powered on, the P2P connection is successfully established between the TCON and the SD, a data transmission stage is started. The configuration information section is subsequent to the start flag bit K1 of a data packet of each row of data, and the EMI reduction mode is turned on in the configuration information section. After completing transmitting the current row of pixel data and the end flag bit K2/K3 of a data packet of each row of data, it is the HBP interval (i.e., a time duration between data packets of adjacent rows of data). At this time, the encoder in the TCON generates the random code. A designed training sub-signal is transmitted, according to the generated random code and the previous training sub-signal sent at the same interval, via the sending interface of the TCON shown in FIG. 1, and is received by the receiving interface of the SD, and a decoder at the receiver decodes according to a same rule as that used by the encoder at the sender.

In this embodiment, a random training signal generated by using the random code replaces a periodic training signal generated by transmission of clock pattern in the prior art. In this way, the origin of generated EMI during the data transmission in the P2P interfaces is eliminated fundamentally, thereby greatly reducing the EMI generated in the P2P interfaces during the data transmission.

Figure 9:
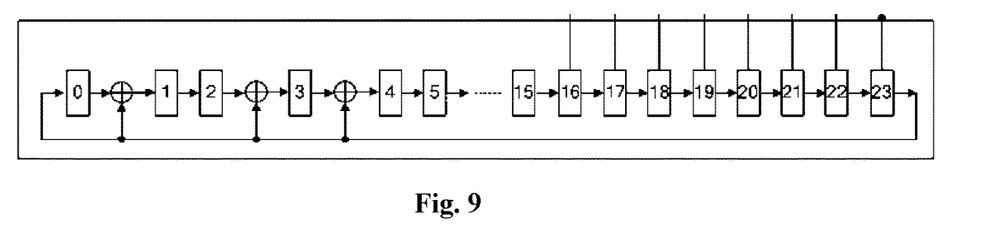
FIG. 9 is a schematic diagram of generating a random code in some embodiments of the present disclosure.

The encoder that generates the random code is shown in FIG. 9, and a generation formula of the encoder is $G_{24}(X) = X^{24} + X^4 + X^3 + X + 1$. X represents a position of XOR, 24-bit data may shift to the right circularly, and an XOR operation is performed on data in a last bit and data in previous bits, to generate the random code. The decoder at the signal receiver may decode according to the same formula to obtain the random code, and determine whether the received training signal is correct according to the random code and the pre-stored training signal set.

Figure 10:
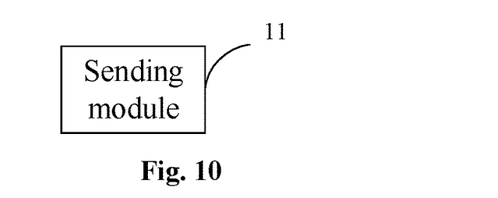
FIG. 10 is a schematic structural diagram of a signal transmission apparatus in some embodiments of the present disclosure.

A signal transmission apparatus is further provided in the embodiments of the present disclosure. The signal transmission apparatus is applied to a signal sender, the signal sender includes a first interface, a point-to-point connection is established between a second interface of a signal receiver and the first interface, as shown in FIG. 10, the signal transmission apparatus includes: a sending module 11, configured to send a non-periodic training signal to the second interface via the first interface in an interval of transmission of pixel data.

Since an origin of the generated EMI during the data transmission is a transmitted periodic training signal in an interval of transmission of pixel data, the non-periodic training signal is sent to the second interface via the first interface in the interval of transmission of pixel data in this embodiment, which eliminates the origin of the generated EMI during the data transmission in P2P interfaces fundamentally, thereby greatly reducing the EMI generated in the P2P interfaces during the data transmission.

Further, the sending module 11 is specifically configured to select a training sub-signal for transmission from a pre-stored training signal set according to a random code outputted by the signal sender and a previous training sub-signal sent at a same interval, wherein the training signal set includes a plurality of training sub-signals, and a combination of any two training sub-signals among the plurality of training sub-signals is a non-periodic signal. Thus, it is ensured that the non-periodic training signal is sent to the second interface via the first interface in the interval of transmission of pixel data.

Figure 11:
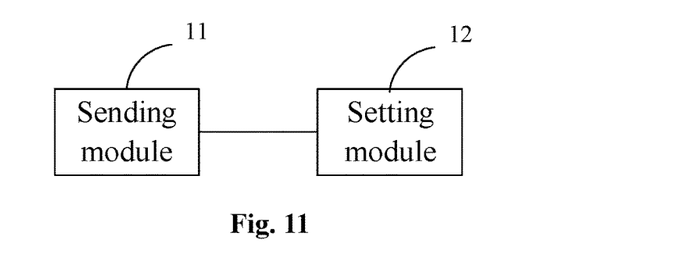
FIG. 11 is a schematic structural diagram of a signal transmission apparatus in some embodiments of the present disclosure.

Further, as shown in FIG. 11, the signal transmission apparatus further includes a setting module 12 configured to set a signal transmission mode as an Electro Magnetic Interference (EMI) reduction mode before sending the non-periodic training signal to the second interface via the first interface.

A function of setting an EMI mode is added in this embodiment. When the EMI reduction mode is not turned on, a periodic training signal is transmitted between the first interface and the second interface according to a conventional mode. When the EMI reduction mode is turned on, the non-periodic training signal is sent to the second interface via the first interface in this embodiment to reduce the EMI generated during the data transmission between the first interface and the second interface.

FIG. 2 is a schematic structural diagram of a data packet of each row of data sent by the first interface to the second interface. The data packet of each row of data includes a start flag bit K1, pixel data, and an end flag bit K2/K3. After the end flag bit K2/K3 of the data packet of each row of data, it is an HBP interval, i.e., a time duration between data packets of adjacent rows of data. In this embodiment, a configuration information section may be set between K1 and the pixel data. After configuring whether to turn on the EMI reduction mode by the configuration information section, specifically, when configuration information is CLOSE, the EMI reduction mode is turned off; as shown in FIG. 6, when the configuration information is OPEN, the EMI reduction mode is turned on.

In addition, the technical solution of this embodiment is not limited to transmitting the non-periodic training signal in the interval between the data packets of adjacent rows of data so as to reduce the EMI, and may also include transmitting a non-periodic training signal in an interval between data packets of adjacent frames of data so as to reduce the EMI. Specifically, related configuration information may be configured in a data packet of each frame of data, and whether to turn on the EMI reduction mode may be configured by the configuration information. Specifically, when the configuration information is CLOSE, the EMI reduction mode is turned off; when the configuration information is OPEN, the EMI reduction mode is turned on.

In a specific embodiment, the signal sender is a timing controller, and the signal receiver is a source driving circuit. Of course, the signal sender involved in the present disclosure is not limited to the timing controller, and may be any port, in a display device, that needs to establish the P2P connection to send data. The signal receiver is not limited to the source driving circuit, and may be any port, in a display device, that needs to establish the P2P connection to receive data.

In a specific embodiment, the training signal set includes a first training sub-signal, a second training sub-signal, a third training sub-signal and a fourth training sub-signal.

The sending module 11 is specifically configured to: (1) send the third training sub-signal when the random code is 1 and the previous training sub-signal sent at the same interval is the first training sub-signal; (2) send the first training sub-signal when the random code is 0 and the previous training sub-signal sent at the same interval is the first training sub-signal; (3) send the fourth training sub-signal when the random code is 1 and the previous training sub-signal sent at the same interval is the second training sub-signal; (4) send the second training sub-signal when the random code is 0 and the previous training sub-signal sent at the same interval is the second training sub-signal; (5) send the fourth training sub-signal when the random code is 1 and the previous training sub-signal sent at the same interval is the third training sub-signal; (6) send the second training sub-signal when the random code is 0 and the previous training sub-signal sent at the same interval is the third training sub-signal; (7) send the third training sub-signal when the random code is 1 and the previous training sub-signal sent at the same interval is the fourth training sub-signal; and (8) send the first training sub-signal when the random code is 0 and the previous training sub-signal sent at the same interval is the fourth training sub-signal.

Further, the first training sub-signal is 1000000000, the second training sub-signal is 0111111111, the third training sub-signal is 1001111111, and the fourth training sub-signal is 0110000000. Thus, it is ensured that any two of the training sub-signals do not constitute a periodic signal.

By constructing four specific training sub-signals and generating random training signals according to the random code in the interval of transmission of pixel data, this embodiment eliminates the origin of generated EMI during the data transmission in the P2P interfaces fundamentally, thereby greatly reducing the EMI generated in the P2P interfaces during the data transmission.

In the technical solution of the present disclosure, the training signal set is not limited to include only four training sub-signals, and may also include more training sub-signals, but if types of the training sub-signals included in the training signal set are increased, complexity of signal transmission is also increased, and then a power consumption of the display device is also increased. Therefore, the training signal set may be designed to include four training sub-signals, without increasing the complexity of the signal transmission and without generating a periodic training signal.

Figure 12:
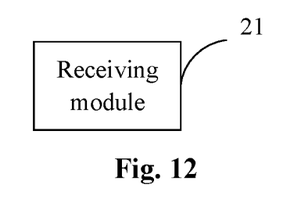
FIG. 12 is a schematic structural diagram of a signal transmission apparatus in some embodiments of the present disclosure.

A signal transmission apparatus is further provided in the embodiments of the present disclosure. The signal transmission apparatus is applied to a signal receiver, the signal receiver includes a second interface, and a point-to-point connection is established between a first interface of a signal sender and the second interface. As shown in FIG. 12, the signal transmission apparatus includes a receiving module 21, configured to receive, via the second interface in an interval of transmission of pixel data, a non-periodic training signal sent by the first interface.

Since an origin of the generated EMI during the data transmission is a transmitted periodic training signal in an interval of transmission of pixel data, the non-periodic training signal is sent to the second interface via the first interface in the interval of transmission of pixel data in this embodiment, which eliminates the origin of the generated EMI during the data transmission in P2P interfaces fundamentally, thereby greatly reducing the EMI generated in the P2P interfaces during the data transmission.

In a specific embodiment, the signal sender is a timing controller, and the signal receiver is a source driving circuit.

Of course, the signal sender involved in the present disclosure is not limited to the timing controller, and may be any port, in a display device, that needs to establish the P2P connection to send data. The signal receiver is not limited to the source driving circuit, and may be any port, in a display device, that needs to establish the P2P connection to receive data.

A display device is further provided in the embodiments of the present disclosure. The display device including the signal transmission apparatus as described above. The display device may be any product or component having a display function, such as a television, a monitor, a digital photo frame, a mobile phone, and a tablet computer. The display device further includes a flexible circuit board, a printed circuit board, and a back plate.

It should be appreciated that the embodiments described above may be implemented by hardware, software, firmware, middleware, microcodes, or a combination thereof. For hardware implementation, a processing unit may be implemented in one or more of Application Specific Integrated Circuits (ASICs), Digital Signal Processors (DSPs), Digital Signal Processing Devices (DSPDs), Programmable Logic Devices (PLDs), Field-Programmable Gate Arrays (FPGAs), a general-purpose processor, a controller, a micro-controller, a microprocessor, and other electronic units for performing the functions described in this application or combinations thereof.

For software implementation, techniques described above may be implemented via modules (such as processes, functions, etc.) that perform the functions described above. Software codes may be stored in a memory and executed by a processor. The memory may be implemented in the processor or external to the processor.

Various embodiments in the specification are described in a progressive manner, wherein each embodiment focuses on differences from other embodiments, and same or similar parts among various embodiments may be obtained by referring to other embodiments.

Those skilled in the art should understand that the embodiments of the present disclosure may be provided as a method, a device, or a computer program product. Therefore, the embodiments of the present disclosure may be a form of a hardware embodiment, a software embodiment, or an embodiment combining software with hardware. Moreover, the embodiments of the present disclosure may be implemented in a form of a computer program product implemented on one or more computer usable storage media (including but not limited to a disk storage, a CD-ROM, an optical storage, etc.) containing a computer usable program code.

The embodiments of the present disclosure are described with reference to flowcharts and/or block diagrams of a method, a user equipment (system) and a computer program product in the embodiments of the present disclosure. It should be appreciated that each process in the flowcharts and/or each block in the block diagrams, and a combination of a process in the flowcharts and/or a block in the block diagrams may be implemented by computer program instructions. The computer program instructions may be provided to a processor of a general purpose computer, a special purpose computer, an embedded processor, or other programmable data processing devices to produce a machine, such that the instructions executed by the processor of the computer or other programmable data processing devices produces a device for realizing functions specified in one or more processes in the flowcharts and/or one or more blocks in the block diagrams.

The computer program instructions may also be stored in a computer readable memory capable of directing a computer or other programmable data processing devices to operate in a particular manner, such that the instructions stored in the computer readable memory produce a manufacture including an instruction device, the instruction device implements functions specified in one or more processes in the flowcharts and/or one or more blocks in the block diagrams.

The computer program instructions may also be loaded onto the computer or other programmable data processing devices, so that a series of operating steps may be performed on the computer or other programmable devices to produce a computer-implemented processing, and thus instructions executed by the computer or other programmable devices provide steps for implementing the functions specified in one or more processes in the flowcharts and/or one or more blocks in the block diagrams.

Although the embodiments of the present disclosure have been described, those skilled in the art may make other replacements and modifications to these embodiments once they know basic inventive concepts. Therefore, the appended claims are intended to be construed to include the embodiments and all replacements and modifications that fall within the scope of the embodiments of the present disclosure.

It should be noted that in the present disclosure, terms describing relations such as first and second are used only to distinguish one entity or operation from another entity or operation, and do not necessarily require or imply that there is any such actual relationship or order between the entities or operations. Moreover, a term "include", "have" or any other variation thereof is intended to encompass non-exclusive inclusion, such that a process, a method, a product or a device including a series of elements includes not only those elements, but also other elements not explicitly listed, or elements inherent to the process, the method, the product or the device. Without more restrictions, an element defined by an expression "including a . . . " does not exclude existence of other identical or different elements in the process, the method, the product or the device including the element.

The aforementioned are merely embodiments of the present disclosure, any modifications and improvements that would easily occur to those skilled in the art, without departing from the technical scope disclosed in the present disclosure, should be encompassed in the protection scope of the present disclosure.

What is claimed is:

1. A signal transmission method applied to a signal sender, the signal sender comprising a first interface, a point-to-point connection being established between a second interface of a signal receiver and the first interface, the signal transmission method comprising:
  sending a non-periodic training signal to the second interface via the first interface in an interval of transmission of pixel data,
  wherein the non-periodic training signal comprises a plurality of training sub-signals, and sending the non-periodic training signal to the second interface via the first interface comprises:
  selecting a training sub-signal for transmission from a pre-stored training signal set according to a random code outputted by the signal sender and a previous training sub-signal sent at a same interval,
  wherein the training signal set comprises the plurality of training sub-signals, and a combination of any two training sub-signals among the plurality of training sub-signals is a non-periodic signal.

2. The signal transmission method according to claim 1, wherein before sending the non-periodic training signal to the second interface via the first interface, the signal transmission method further comprises:
setting a signal transmission mode as an Electro Magnetic Interference (EMI) reduction mode.

3. The signal transmission method according to claim 1, wherein the signal sender is a timing controller.

4. The signal transmission method according to claim 1, wherein the training signal set comprises a first training sub-signal, a second training sub-signal, a third training sub-signal and a fourth training sub-signal, selecting the training sub-signal for transmission from the pre-stored training signal set, according to the random code outputted by the signal sender and the previous training sub-signal sent at the same interval comprises:
sending the third training sub-signal when the random code is 1 and the previous training sub-signal sent at the same interval is the first training sub-signal;
sending the first training sub-signal when the random code is 0 and the previous training sub-signal sent at the same interval is the first training sub-signal;
sending the fourth training sub-signal when the random code is 1 and the previous training sub-signal sent at the same interval is the second training sub-signal;
sending the second training sub-signal when the random code is 0 and the previous training sub-signal sent at the same interval is the second training sub-signal;
sending the fourth training sub-signal when the random code is 1 and the previous training sub-signal sent at the same interval is the third training sub-signal;
sending the second training sub-signal when the random code is 0 and the previous training sub-signal sent at the same interval is the third training sub-signal;
sending the third training sub-signal when the random code is 1 and the previous training sub-signal sent at the same interval is the fourth training sub-signal;
sending the first training sub-signal when the random code is 0 and the previous training sub-signal sent at the same interval is the fourth training sub-signal.

5. The signal transmission method according to claim 4, wherein the first training sub-signal is 1000000000, the second training sub-signal is 0111111111, the third training sub-signal is 1001111111, and the fourth training sub-signal is 0110000000.

6. A signal transmission apparatus applied to a signal sender, the signal sender comprising a first interface, a point-to-point connection being established between a second interface of a signal receiver and the first interface, the signal transmission apparatus comprising:
a sending circuit, configured to send a non-periodic training signal to the second interface via the first interface in an interval of transmission of pixel data,
the non-periodic training signal comprises a plurality of training sub-signals,
the sending circuit is configured to select a training sub-signal for transmission from a pre-stored training signal set according to a random code outputted by the signal sender and a previous training sub-signal sent at a same interval, wherein the training signal set comprises the plurality of training sub-signals, and a combination of any two training sub-signals among the plurality of training sub-signals is a non-periodic signal.

7. The signal transmission apparatus according to claim 6, further comprising:
a setting circuit, configured to set a signal transmission mode as an Electro Magnetic Interference (EMI) reduction mode before sending the non-periodic training signal to the second interface via the first interface.

8. The signal transmission apparatus according to claim 6, wherein the signal sender is a timing controller.

9. The signal transmission apparatus according to claim 6, wherein the training signal set comprises a first training sub-signal, a second training sub-signal, a third training sub-signal and a fourth training sub-signal, the sending circuit is specifically configured to:
send the third training sub-signal when the random code is 1 and the previous training sub-signal sent at the same interval is the first training sub-signal;
send the first training sub-signal when the random code is 0 and the previous training sub-signal sent at the same interval is the first training sub-signal;
send the fourth training sub-signal when the random code is 1 and the previous training sub-signal sent at the same interval is the second training sub-signal;
send the second training sub-signal when the random code is 0 and the previous training sub-signal sent at the same interval is the second training sub-signal;
send the fourth training sub-signal when the random code is 1 and the previous training sub-signal sent at the same interval is the third training sub-signal;
send the second training sub-signal when the random code is 0 and the previous training sub-signal sent at the same interval is the third training sub-signal;
send the third training sub-signal when the random code is 1 and the previous training sub-signal sent at the same interval is the fourth training sub-signal;
send the first training sub-signal when the random code is 0 and the previous training sub-signal sent at the same interval is the fourth training sub-signal.

10. The signal transmission apparatus according to claim 9, wherein the first training sub-signal is 1000000000, the second training sub-signal is 0111111111, the third training sub-signal is 1001111111, and the fourth training sub-signal is 0110000000.

11. A display device, comprising:
the signal transmission apparatus according to claim 6; and
a signal receiver comprising a second interface and a receiving circuit,
wherein a point-to-point connection is established between the first interface of the signal transmission apparatus and the second interface, and
the receiving circuit is configured to receive, via the second interface in an interval of transmission of pixel data, a non-periodic training signal sent by the first interface.

12. The display device according to claim 11, wherein, the signal receiver is a source driving circuit.

13. A signal transmission method applied to a signal sender, the signal sender comprising a first interface, a point-to-point connection being established between a second interface of a signal receiver and the first interface, the signal transmission method comprising:
sending a non-periodic training signal to the second interface via the first interface in an interval of transmission of pixel data, wherein the non-periodic training signal comprises a plurality of training sub-signals, sending the non-periodic training signal to the second interface via the first interface comprises:

selecting any one of the plurality of training sub-signals for transmission from a pre-stored training signal set when a training sub-signal is to be sent for a first time in the interval.

14. The signal transmission apparatus according to claim 6, wherein the non-periodic training signal comprises a plurality of training sub-signals, the sending circuit is configured to select any one of the plurality of training sub-signals for transmission from a pre-stored training signal set when a training sub-signal is to be sent for a first time in the interval.

15. The signal transmission apparatus according to claim 6, further comprising:

an encoder, configured to generate the random code.

16. The display device according to claim 11, wherein the signal receiver comprises a decoder, configured to decode according to a same formula as that used by the signal transmission apparatus, obtain a random code, and determine whether a received training signal is correct according to the random code and a pre-stored training signal set.

* * * * *